(12) United States Patent
Heimbuch et al.

(10) Patent No.: US 8,662,460 B2
(45) Date of Patent: Mar. 4, 2014

(54) WEIGHT ADAPTER BRACKET

(75) Inventors: Benjamin J. Heimbuch, Cedar Falls, IA (US); Deepak Bhoir, Warananagar (IN)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/959,759

(22) Filed: Dec. 3, 2010

(65) Prior Publication Data
US 2012/0138756 A1    Jun. 7, 2012

(51) Int. Cl.
A47B 96/06    (2006.01)

(52) U.S. Cl.
USPC ........ 248/205.1; 248/200; 248/364; 248/647; 280/759; 414/719; 212/178

(58) Field of Classification Search
USPC ......... 248/205.1, 205.4, 200, 220.22, 223.31, 248/224.61, 364, 694, 640, 647; 280/759, 280/760, 758, 757, 755; 414/719, 703; 212/178, 195
See application file for complete search history.

(56) References Cited

U.S. PATENT DOCUMENTS

| | | | | |
|---|---|---|---|---|
| 3,032,352 A * | 5/1962 | Barrett | ......... | 280/759 |
| 3,888,507 A * | 6/1975 | Berghausen | ......... | 280/759 |
| 3,944,252 A * | 3/1976 | Barth | ......... | 280/759 |
| 4,094,534 A * | 6/1978 | Welke et al. | ......... | 280/760 |
| 4,377,300 A * | 3/1983 | Old | ......... | 280/758 |
| 4,462,611 A * | 7/1984 | Sieren | ......... | 280/759 |
| 4,537,423 A * | 8/1985 | Nau et al. | ......... | 280/759 |
| 4,664,404 A * | 5/1987 | Schultz | ......... | 280/461.1 |
| 5,088,882 A * | 2/1992 | Lovitt, Jr. | ......... | 414/723 |
| 5,219,180 A * | 6/1993 | Zipser et al. | ......... | 280/759 |
| 5,462,309 A * | 10/1995 | Jeffers et al. | ......... | 280/759 |
| 5,690,360 A * | 11/1997 | Teich | ......... | 280/759 |
| 6,209,898 B1 * | 4/2001 | Fortier et al. | ......... | 280/187 |
| 6,533,319 B1 | 3/2003 | Denby et al. | | |
| 6,880,854 B2 * | 4/2005 | Powell | ......... | 280/759 |
| 7,168,740 B2 * | 1/2007 | Kobayashi et al. | ......... | 280/759 |
| 7,354,066 B2 * | 4/2008 | Yamamoto | ......... | 280/759 |
| 7,618,062 B2 * | 11/2009 | Hamm et al. | ......... | 280/759 |
| 7,658,293 B2 * | 2/2010 | Yamamoto et al. | ......... | 212/178 |
| 7,905,227 B2 * | 3/2011 | Luconi et al. | ......... | 126/696 |
| 7,971,906 B2 * | 7/2011 | Defrancq | ......... | 280/759 |
| 8,118,326 B2 * | 2/2012 | Moore | ......... | 280/759 |
| 8,430,427 B1 * | 4/2013 | Gaeddert et al. | ......... | 280/759 |
| 2002/0014506 A1 * | 2/2002 | Teich | ......... | 224/441 |
| 2004/0164537 A1 * | 8/2004 | Niemela | ......... | 280/759 |
| 2008/0129028 A1 * | 6/2008 | Hamm et al. | ......... | 280/759 |
| 2011/0031728 A1 * | 2/2011 | Arzberger et al. | ......... | 280/755 |
| 2011/0308870 A1 * | 12/2011 | Rasset et al. | ......... | 180/68.4 |

* cited by examiner

Primary Examiner — Terrell McKinnon
Assistant Examiner — Monica Millner

(57) ABSTRACT

A weight adapter bracket is provided for a drawbar support frame having a cylinder coupling member for coupling to a hydraulic cylinder. The coupling member has a slot for removably receiving an end of the cylinder. The adapter bracket includes a lug which extends from a flange. The lug is removably receivable by the coupling member, and the flange is adapted to engage and support a weight. A coupling bore extends through the lug and bracket bores extend through the coupling member. A coupling pin is insertable through the coupling bore and the bracket bores and to releasably hold the bracket in the coupling member. A pin bore extends vertically through the bracket, and a further coupling pin is removably insertable through the pin bore. The further coupling pin is adapted to engage a weight which is mounted on the bracket.

4 Claims, 7 Drawing Sheets

US 8,662,460 B2

WEIGHT ADAPTER BRACKET

FIELD OF THE INVENTION

The present disclosure relates to an adapter bracket for attaching ballast weights.

BACKGROUND OF THE INVENTION

A working vehicle such as an agricultural tractor may be used as a source of tractive power and/or power take-off (PTO) power. When work implements are attached or mounted to one end of the tractor, it may be necessary to mount ballast weights at the other end of the tractor. In the case of a tractor configured as a front end loader, a bucket or other attachment is used to push or lift various objects. Ballast weights should be mounted at the rear of the tractor are recommended for more stable and productive use of the front end loader.

One type of ballast is in the form of wheel weights which are attached to the rear wheels, typically radially within the wheel rim. Another type of ballast is fluid, such as calcium chloride or other suitable fluid, which is injected into the inner tubes within the rear tires. A further type of ballast is a ballast assembly which is carried by a pair of lower lift arms on a 3 point hitch assembly at the rear of the tractor. Examples of such ballast assemblies are disclosed in U.S. Pat. No. 6,533,319 (Denby et al.) and U.S. Pat. No. 4,664,404 (Schultz), which are each assigned to the assignee of the present invention and incorporated herein by reference. Although advantageous for counter-balancing a load on a front end loader of a tractor, a ballast assembly as described above which is carried by the lower lift arms of a 3 point hitch assembly may interfere with use of the drawbar and/or PTO shaft at the rear of the tractor. What is needed is a simple mechanism for mounting weights on a rear hitch of a tractor.

SUMMARY

Accordingly, an aspect of this disclosure is to provide a mechanism for mounting weights on a rear of a tractor. A drawbar support or hitch frame includes brackets for coupling to hydraulic cylinders. Each bracket includes left and right mounting members having a slot formed therebetween for removably receiving an end of the cylinder. A weight adapter includes a lug which extends from a flange 46. The lug is removably receivable by the bracket, and the flange is adapted to engage and support a weight. A coupling bore extends through the lug. Bracket bores extend through the bracket. A coupling pin is insertable through the coupling bore and the bracket bores to releasably hold the adapter in the bracket. A pin bore extends vertically through the weight adapter. A further coupling pin is removably insertable through the pin bore, and is adapted to engage a weight which is mounted on the weight adapter. A lip 52 projects from the flange, and is adapted to be received by a groove formed in the weight. The lip may project upwardly. The flange also includes a slot which may be rectangular and which opens in a rearward direction. The left and right mounting members each have a convex surface. The flange has a concave forward facing left surface and a concave forward facing right surface. The left and right surfaces mate with the corresponding convex surfaces of the mounting members. The result is a mechanism which mounts weights to the hitch cylinder bracket of a tractor rear hitch.

DESCRIPTION OF THE PREFERRED EMBODIMENT

Figure 1:
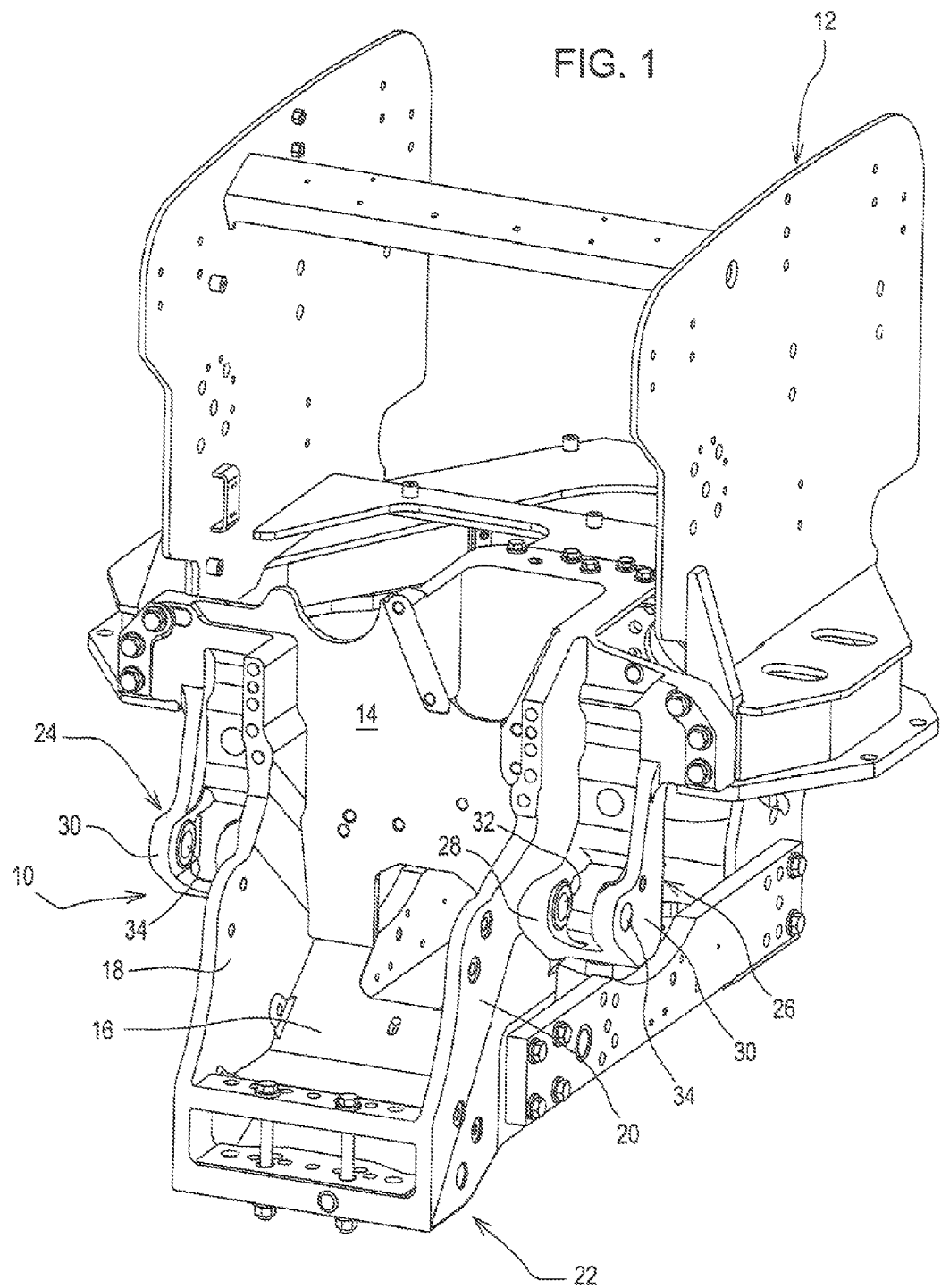
FIG. 1 is a perspective view of a drawbar support frame for which a weight bracket is adapted.
Figure 6:
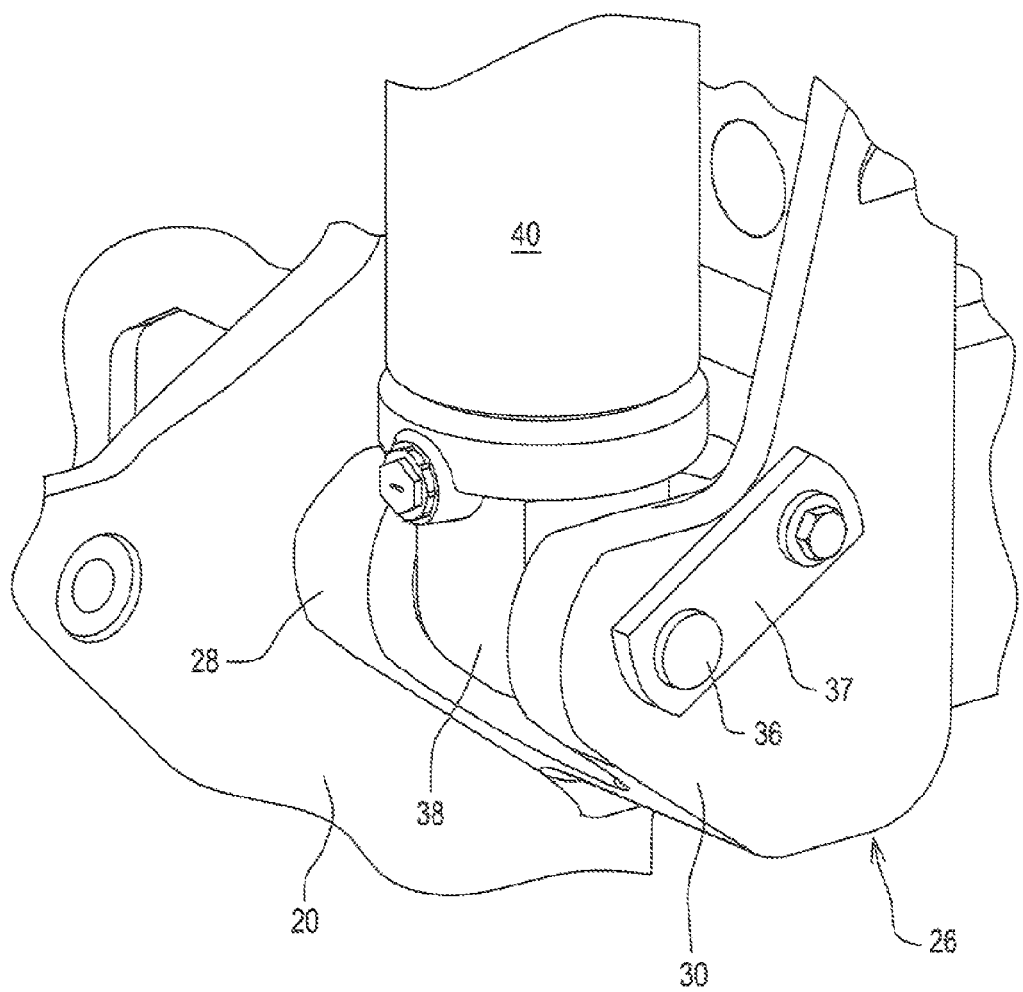
FIG. 6 is a detailed perspective view of a coupling bracket of FIG. 1 with a hydraulic cylinder coupled thereto.
Figure 7:
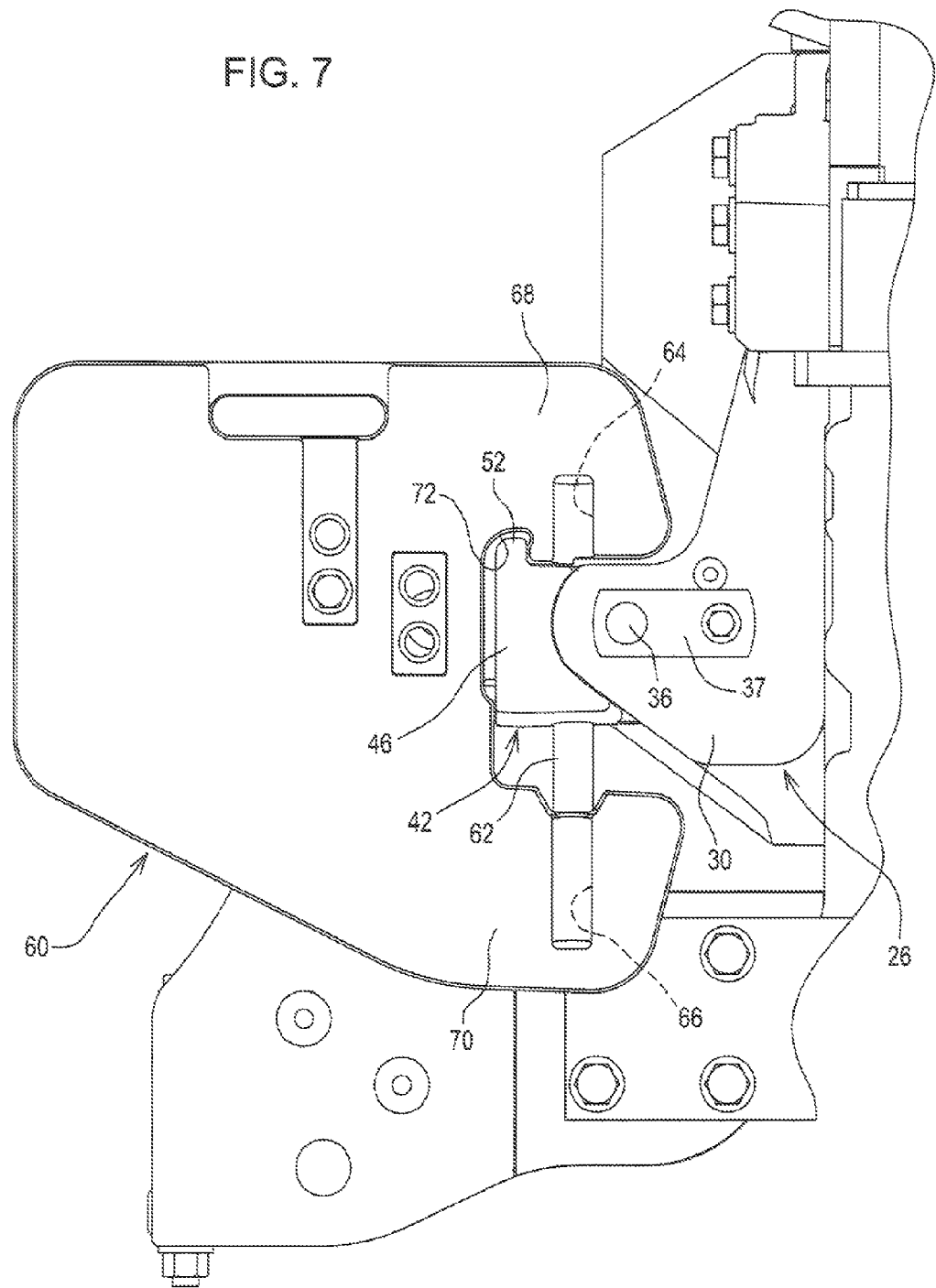
FIG. 7 is a side view showing weights mounted on the weight bracket of FIG. 2.

Referring to FIG. 1, a drawbar support frame 10 is attached, such as by bolts, to a rear frame part 12 of a vehicle (not shown), such as a tractor or other type of utility or work vehicle. Frame 10 includes a front plate 14, a bottom plate 16, a pair of side plates 18 and 20, and a drawbar support unit 22. Left and right side hitch cylinder coupling members 24 and 26 project generally laterally from the respective side plates 18 and 20. Each of the coupling members 24 and 26 includes laterally spaced apart plate members 28 and 30, in which are formed a pair of aligned bores 32 and 34. As best seen in FIG. 6, coupling bores 32 and 34 extend through plate members 28 and 30, respectively, and are adapted to receive a coupling pin 36 which is pivotally received by a coupling ear 38 of a conventional hitch cylinder 40. As best seen in FIGS. 6 and 7, a strap 37 may be welded to the pin 36 and attached, such as by bolts, to the side of the coupler members 24 and 26. The strap 37 may be used to hold the pin 36 in place and to prevent rotation of the pin 36.

Figure 2:
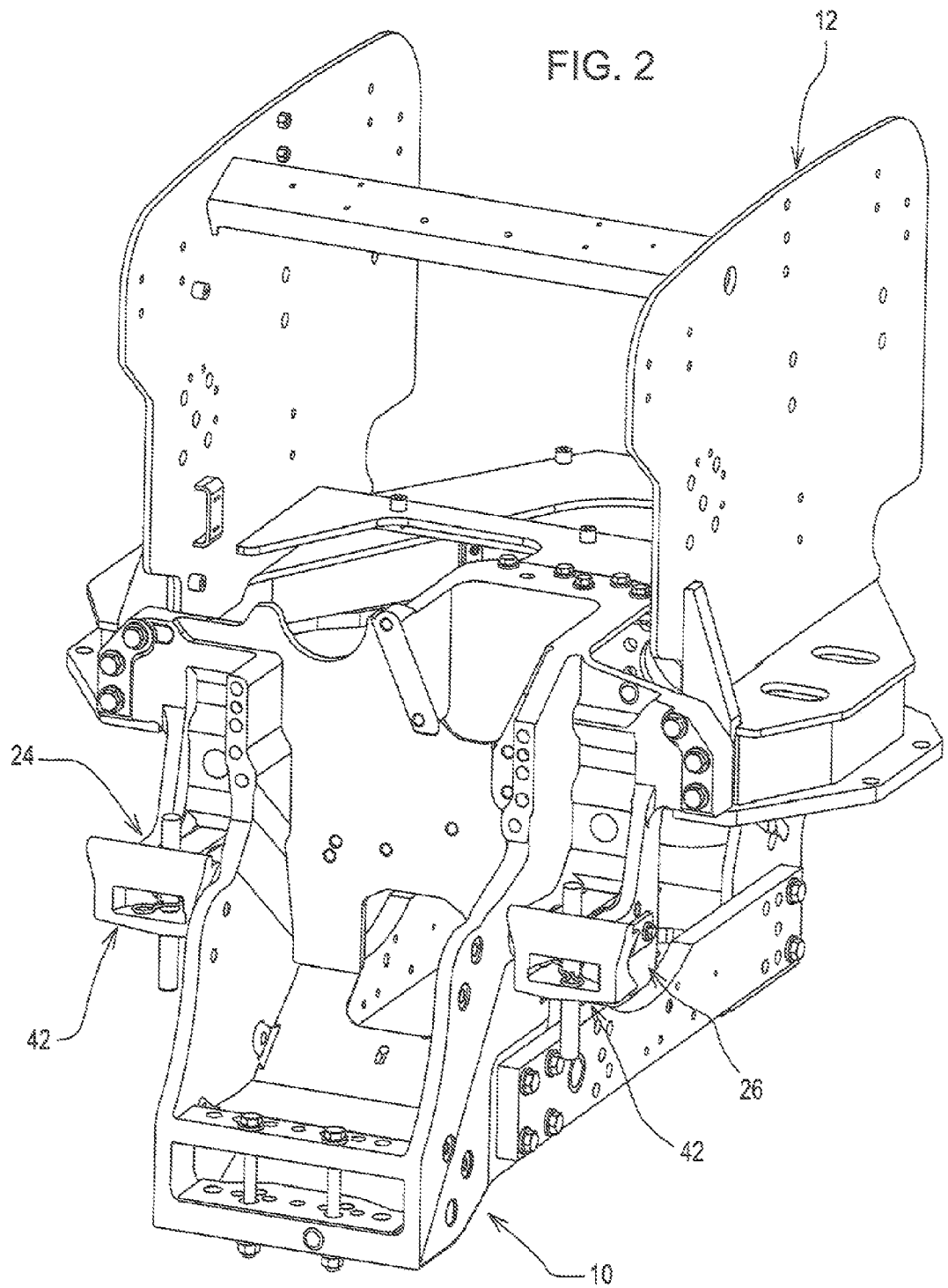
FIG. 2 is a perspective view of the drawbar support frame of FIG. 1 with weight brackets mounted thereon.

As best seen in FIG. 2, each of the coupling members 24 and 26 is capable of receiving a weight bracket 42. Each weight bracket 42 is held in its respective coupling member 24 and 26 by the horizontal coupling pin 36 which is hidden in the view of FIG. 2.

Figure 3:
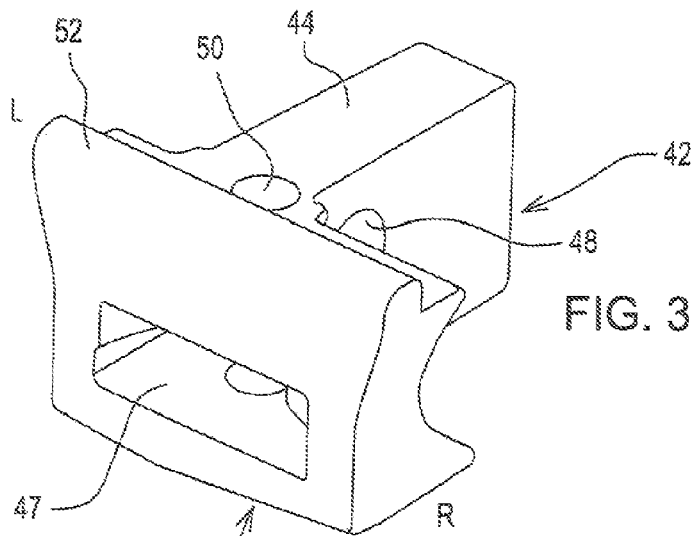
FIG. 3 is an upper rear right side perspective view of one of the weight brackets of FIG. 1.
Figure 4:
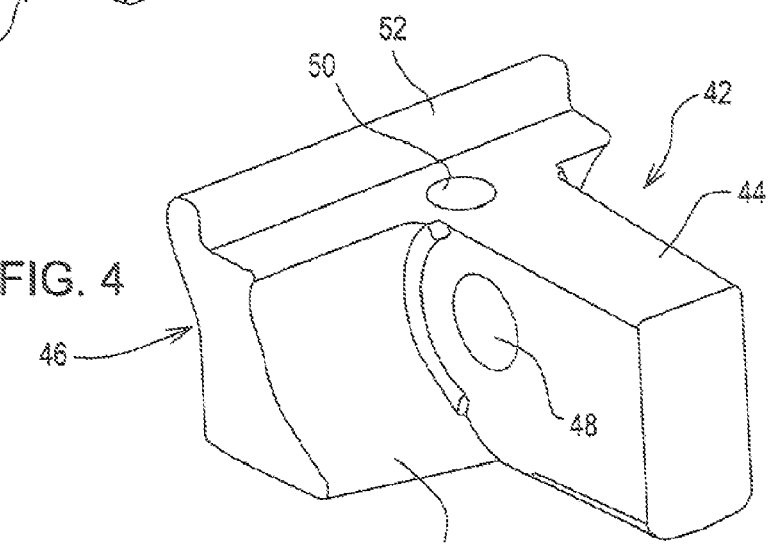
FIG. 4 is an upper front right side perspective view of the weight bracket of FIG. 3.
Figure 5:
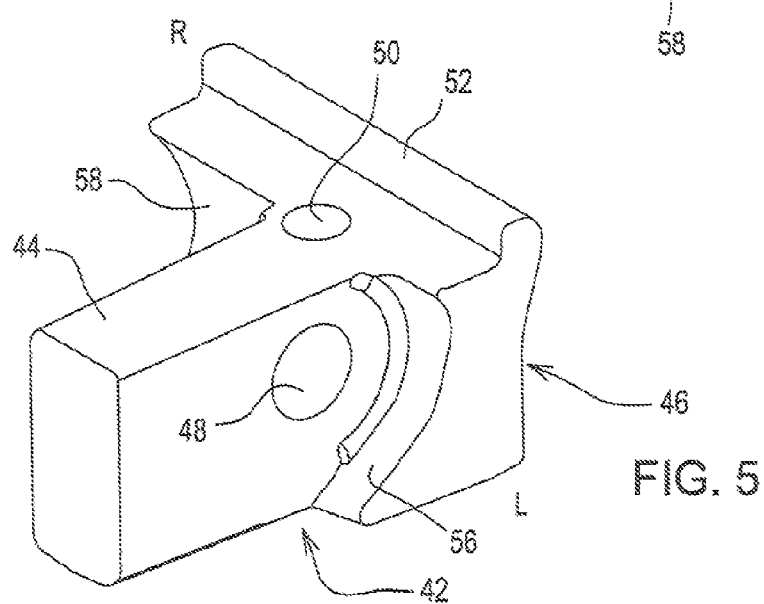
FIG. 5 is an upper front left side perspective view of the weight bracket of FIG. 3.

Referring now to FIGS. 3, 4 and 5, the weight bracket 42 includes a central fore-and-aft extending lug 44 which projects from a flange 46. A coupling bore 48 extends laterally through a rear end of lug 44. A pin bore 50 extends vertically through a rear end of lug 44. Bore 50 is spaced apart, preferably rearwardly, from bore 48 so that pins can be inserted through both bores at the same time. The flange 46 includes a lip 52 which projects upwardly from a rear end thereof. The flange 46 also includes a slot 54 which may be rectangular and which opens in a rearward direction. The flange 46 has a concave forward facing left surface 56 and a concave forward facing right surface 58. Surfaces 56 and 58 mate with the corresponding surfaces of the plate members 28 and 30.

Figure 8:
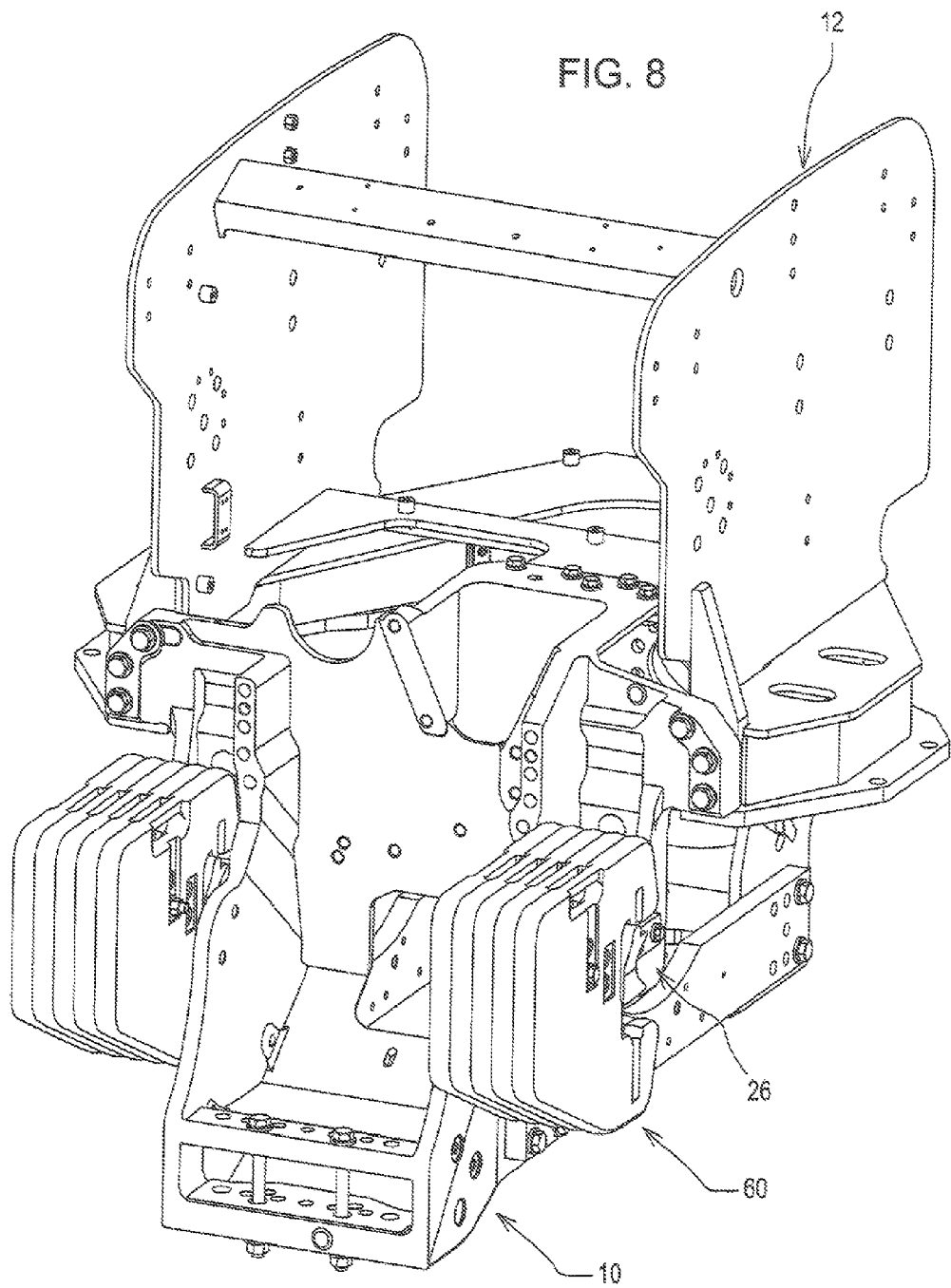
FIG. 8 is an upper front left side perspective view of the weight bracket of FIG. 2.
Figure 9:
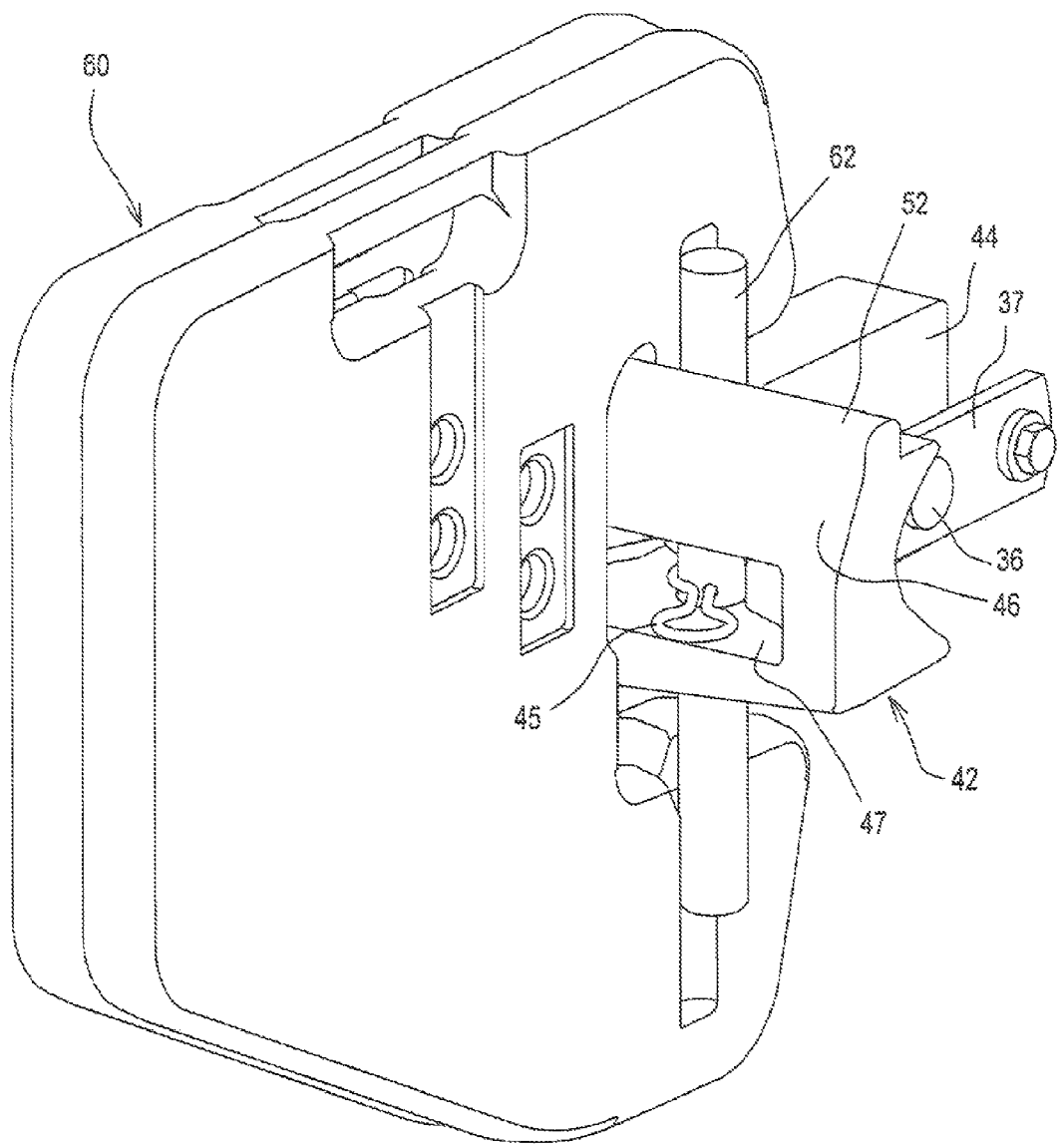
FIG. 9 is an enlarged perspective view of a portion of the weight bracket of FIG. 8.

Referring now to FIGS. 2, 7 and 8, the weight adapter 42 is mounted to the coupling member 26 and held thereto with the pin 36. A plurality of weights 60 are mounted on the weight bracket 42. As best seen in FIG. 7, each weight 60 includes an upper leg 68 and a lower leg 70, and a downwardly opening groove 72 extends laterally though the weight 60 adjacent to a rear end of the upper leg 68. Each weight 60 is releasably held onto the bracket 42 by a pin 62 which is received in bores 64 and 66 which are formed in the upper leg 68 and the lower leg 70 of the weights 60. Referring back to FIG. 3, a rectangular opening or slot 47 may be formed in the rear end of the flange 46. As best seen in FIG. 9, the opening 47 permits access to install and remove a cotter pin 45 which may be used to retain the vertical pin 62 in the assembly. The pin 62 prevents the weights 60 from sliding left and right on the bracket 46 and falling off.

The result is a weight support bracket which permits ballast to be attached to the rear of a tractor, yet at the same time retains functionality for different tractor configurations, specifically the attachment of the hitch lift cylinders. This bracket can be used on tractors having a rear hitch assembly and, more particularly, on tractors where a rear weight assembly is desired to be mounted on a three-point hitch assembly.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A ballast assembly comprising:
   a drawbar support frame adapted to be non-movably fixed to a vehicle frame, the drawbar support frame having a cylinder coupling member adapted to be removably coupled to a hydraulic cylinder, the coupling member having a slot for removably receiving an end of the cylinder;
   an adapter bracket comprising a lug extending from a flange, the lug being removably receivable by said slot in the coupling member, and the flange being adapted to engage and support a weight, a lip projecting from the flange, the lip being adapted to be received by a groove formed in the weight,
   a coupling bore extending through the lug;
   bracket bores extending through the coupling member;
   a coupling pin is insertable through the coupling bore and the bracket bores and to releasably hold the bracket in the coupling member;
   a pin bore extends vertically through the bracket; and
   a further coupling pin is removably insertable through the pin bore, the further coupling pin being adapted to engage a weight which is mounted on the bracket.

2. The ballast assembly of claim 1, wherein:
   the lip projects upwardly.

3. The ballast assembly of claim 1, wherein:
   the flange also includes a slot which may be rectangular and which opens in a rearward direction.

4. A ballast assembly comprising:
   a drawbar support frame adapted to be non-movably fixed to a vehicle frame, the drawbar support frame having a cylinder coupling member adapted to be removably coupled to a hydraulic cylinder, the coupling member having a slot for removably receiving an end of the cylinder; and
   an adapter bracket comprising a lug extending from a flange, the lug being removably receivable by said slot in the coupling member, and the flange being adapted to engage and support a weight, a lip projecting from the flange, the lip being adapted to be received by a groove formed in the weight;
   the coupling member including left and right plate members, each having a convex surface; and
   the flange has a concave forward facing left surface and a concave forward facing right surface, said left and right surfaces mating with corresponding convex surfaces of the plate members.

* * * * *